Aug. 30, 1927. 1,640,990
G. H. HINTON ET AL
METHOD OF REMOVING AND CATCHING THE SCALES OF FISH AT TRAPS
Filed July 29, 1926
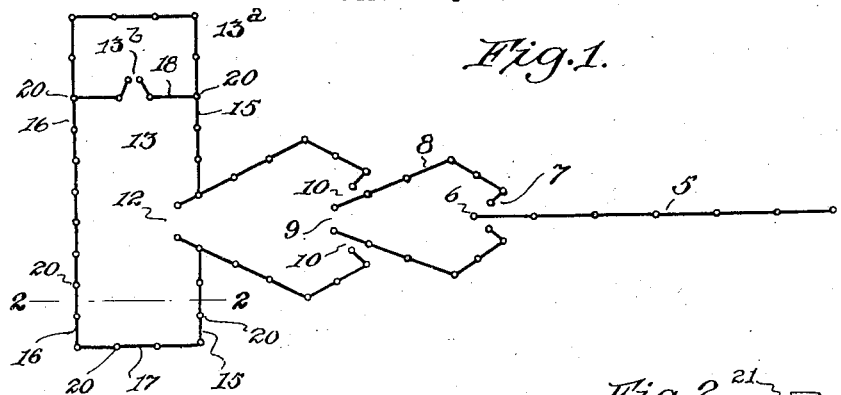
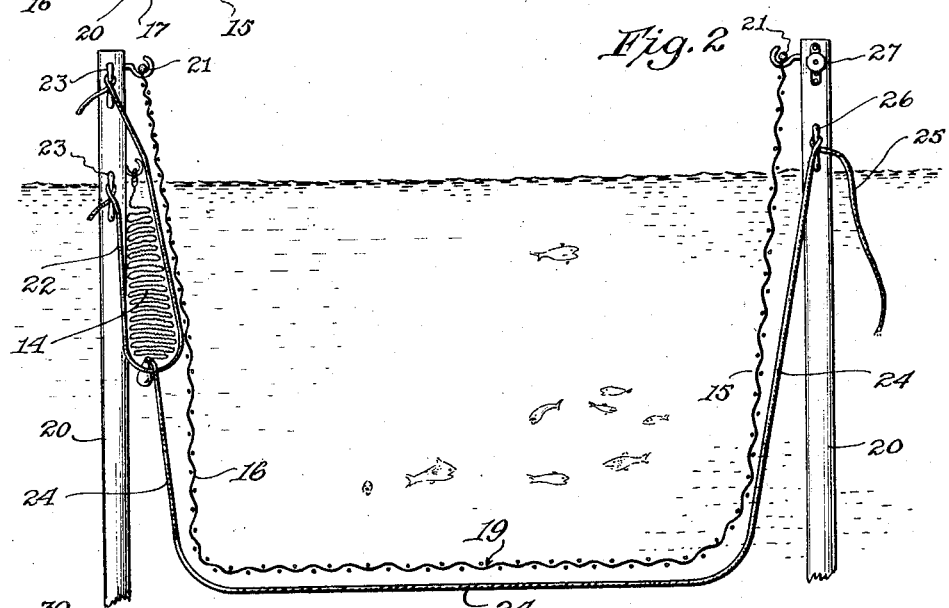
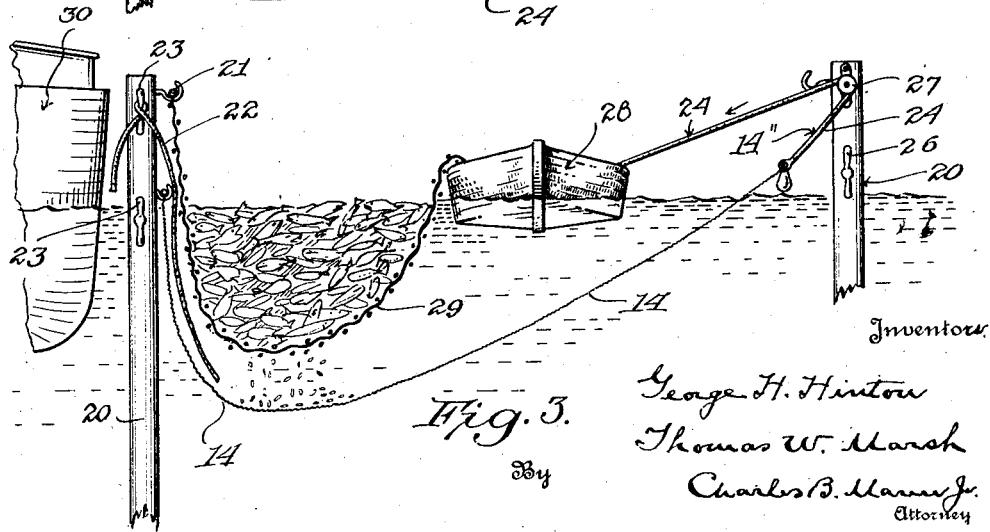

Patented Aug. 30, 1927.

1,640,990

UNITED STATES PATENT OFFICE.

GEORGE H. HINTON AND THOMAS W. MARSH, OF REEDVILLE, VIRGINIA.

METHOD OF REMOVING AND CATCHING THE SCALES OF FISH AT TRAPS.

Application filed July 29, 1926. Serial No. 125,617.

Our invention relates to a method of removing and catching the scales of fish at the trap.

It is a recognized fact that there is a commercial use to which the scales of some kinds of fish may be put. This is particularly true of such fish as herring or shad and some others.

Just what it is in these scales that creates a market value for them is immaterial to the present invention, but we have found in practice that fish-scales which have been removed from the fish after the latter have been taken aboard a boat or at the packing houses have a lesser value for the substances they contain than when the scales are collected while the fish are in the water and alive.

This difference in the value of fish-scales has led us to devise a method for removing the scales from the fish and collecting the same at the trap.

We have discovered from practical experience that fish lose many of their scales during the operation of removing them from the pound or other nets or traps and that those scales are lost because the pound or trap-nets are of too large a mesh to retain the scales.

It is impractical to utilize trap nets of sufficiently fine mesh to retain the scales because such fine nets offer too much resistance for the flowing of the tides therethrough and are thus dislodged, broken or carried away which results in a loss and in liberating the trapped fish.

Our invention therefore has for its object to provide a novel method whereby the removal of the scales of the fish may be effected at the trap and the removed scales collected.

With these objects in view, the invention is illustrated in the accompanying drawings, wherein,—

Fig. 1 shows in a diagrammatic way a form or ordinary and well-known pound or trap net which is well adapted for the carrying out of our method when combined with our improved arrangement of catch net.

Fig. 2 illustrates a cross-sectional detail through the main pound showing the latter in the set or operating position and also indicates the folded catch-net at one side of the pound net but in the inoperative position, and Fig. 3 shows another cross-sectional detail through the main pound net,—the latter however being drawn up with the trapped fish all located at one side thereof,—the catch-net also being drawn beneath the drawn-up pound net to catch the scales shed from the fish.

It is to be understood that the drawings are merely illustrative of a structure by which our method may be carried out but that the invention is not to be restricted to the structure therein shown.

In carrying out our method we find it convenient to make use of an ordinary pound or trap net structure that is well-known to the fisherman, and which in this instance includes a straight stretch 5, of netting which is termed the leader and which has one end 6, terminating at the mouth 7 of a heart-shaped netting 8 into which the fish are directed and this heart-shaped net 8, has its smaller outlet-end 9, opening into the mouth 10 of the second heart-shaped net 11. The number of these heart-shaped nets employed may vary, and may be one or more in number, but the small end 12, of the innermost heart-shaped net projects into the main pound or crib net 13 which latter is closed on all sides and the bottom so that the fish entering this pound or crib are trapped therein.

In practice, the small or tunnel-end 12 of the innermost heart-shaped net 11 is arranged to be swung laterally or vertically to effect its closure just prior to the operation of hauling as will presently be more fully explained.

In some instances, fishermen prefer to add a pocket net to the main pound or crib such as is indicated at 13ª, wherein this pocket is located at one side of the pound and has a funnel or opening 13ᵇ, to permit the fish to pass from the main pound into the pocket but prevent their return. This pocket structure is particularly desirable in trapping herring and shad and some other fish, as fish of these varieties seem to naturally seek the pocket.

The pocket 13ª is desirable because it is considerably smaller than the main pound and therefore more readily manipulated by the fishermen to remove the fish.

Our invention however is just as applicable to the pocket structure as to a main pound net and the claims are to be construed with this in mind.

The entire structure thus described is well-known but is well adapted for the carrying out of our invention.

The netting utilized in the structures 5—8—11 and 13 is staked out in the water and is subject to the action of the tides as well as grass and other matter that is washed back and forth with the tides. For this reason the mesh of these nets must be sufficiently large to offer as little resistance as possible but small enough to prevent the escape of the fish. However, these nets are not of small enough mesh to retain small particles such as the scales of fish because such small mesh nets would offer too much resistance to the tides and could not be held in place.

We therefore make use of a catch device 14, which we utilize only at the time of the haul and which we place beneath the trapped fish either in the pound or the pocket so as to catch the scales that are removed from the fish when we subject those trapped fish to an operation which effects the removal of those scales before the fish are dipped from the trap.

This catch device may be formed of netting or a fabric that is loosely woven so the water can readily drain therethrough but which will prevent the escape of particles as small as fish scales.

One arrangement of catch-device 14, is disclosed in Figs. 2 and 3 of the drawing and will now be briefly explained.

In this instance the pound net has opposite side walls 15 and 16; opposite end walls 17 and 18 and a bottom 19, all of large mesh-netting, and this entire crib or pound is sustained by suitable stakes 20. The means employed to attach this pound-net to the stakes is not important but is usually such as to permit the ready detachment of its upper rope-bound edge 21.

In the present instance, we show the stakes at the side 16 of the pound net or crib 13, as sustaining a small mesh catch-device 14,—this catch-device normally, when the trap is open to allow the fish to enter, is held raised by said stakes at said pound-net side 13.

Also in this instance, we merely show short tie-ropes 22, which pass under the folded or gathered-up catch-device, which ropes are secured by cleats 23 on the stakes.

This leaves the catch-device 14 in position where it may be accessible, but normally gathered up so the action of the tides will not dislodge it.

From the lower edges of the gathered-up catch-device, we pass a series of ropes 24 down and under the pound-net 13 then across to the stakes at the side 15 of the pound-net where the free-ends 25, of said ropes 24 are made fast to cleats 26.

Above these cleats, we may provide a series of pulleys 27 on said stakes at the side 15 of the pound, for a purpose that will presently be explained.

To the lower edge of the gathered-up catch device 14, we also attach a series of weights 14ª, which latter will obviously facilitate the dropping of the device when the tie ropes 22 are released. Of course this is optional with the fisherman.

The steps employed to effect removal of the scales from the fish and the removal of the fish themselves from the trap will now be explained.

The fishermen approach the trap in their large boat and make fast to or anchor at, say the long side 16 of the pound or pocket. With a small boat 28 the men first close the tunnel at 12 to prevent the escape of the fish and if they propose to fish the pound, they then proceed to unfasten the rope-bound edge 21 along the side 15 and pull that side (15) of the pound up and deposit the drawn-up part in the bottom of the small boat.

The men in this small boat also detach the ends 25 of the rope 24 and pass those ends over the pulleys 27 as indicated in Fig. 3 of the drawing so that as the small boat 28 moves toward the side 16 of the pound the ropes 24 will be drawn downwardly and under the pound,—the tie ropes 22 having been released, so that the catch device will pass beneath the pound net as the fish are collected in the latter net adjacent to the side 16.

The particular manner of fishing from the pound or pocket is not essential as the steps in manipulating the pound or pocket nets will vary with the ideas of the fisherman, but in any event the pound or pocket net is to be raised, beginning at one side so as to drive the fish into a confined space.

When the fish are collected at the one side 16 of the pound or pocket the catch device 14 will have been extended beneath those collected fish so that the fish will then be held in a comparatively small loop 29 between the small boat 28 on the one side and the large boat 30 on the other side.

As these fish are collected into a comparatively small area of the pound or pocket, they flounder about and frictionally rub each other, (being urged in this floundering about by small hand nets on poles in the hands of the fishermen) with the result that a large proportion of their scales are scraped off but as these scales are freed, they sift through the large mesh pound or pocket nets and are caught in the scale catch device 14 underneath.

After the fish have floundered about as above described for a sufficient period of time to effect the removal of a large proportion of the scales, a fisherman on the larger boat 30 will remove the fish by means of a hand net and deposit them in the larger boat.

When the fish have finally been removed, the men in the smaller boat may entirely detach the edge 21 of the main pound or pocket net at the stakes on the side 16 so that the catch device 14 can be drawn up sufficiently to permit the collected scales therein to be scooped therefrom, after which the nets are restored to their normal positions and the trap set for another catch.

It will thus be understood that by means of this method the fish are first trapped, then collected into a confined space where they will be brought into frictional contact with each other so as to effect a removal of their scales, and the removed scales are caught in a catch-device from which latter they may be gathered and the scales are thus collected at the trap.

Having described our invention, we claim:

1. The method of collecting scales from live fish consisting in trapping the fish in a net having a mesh that will permit the tides to wash therethrough, drawing the trap-net containing the live fish so as to gather the live fish in a confined space and cause them to frictionally rub each other to remove their scales while held in the original trap-net and employing a finer mesh net beneath the gathered together trap-net to catch the scales thus removed at the trap.

2. The method of collecting scales from fish at the trap consisting in trapping the fish, gathering the trapped fish into a confined space to cause them to frictionally engage each other and spreading a scale catching device beneath the confined fish to collect the scales removed as the result of the frictional contact.

3. The method of collecting scales from fish consisting in trapping the fish in a staked net of a mesh that will permit the tides to wash therethrough without displacement, then elevating the trap net to gather the fish in a small space, passing a scale catching device beneath the fish and holding the same in place while the confined fish flounder about and by frictional contact remove their scales the removed scales being caught in the scale catching device.

In testimony whereof they affix their signatures.

GEORGE H. HINTON.
THOMAS W. MARSH.